(12) United States Patent
Perez-Camargo et al.

(10) Patent No.: US 8,091,509 B2
(45) Date of Patent: Jan. 10, 2012

(54) METHOD FOR IMPROVING DOG FOOD

(75) Inventors: Gerardo Perez-Camargo, House Springs, MO (US); Jean-Christophe Bouthegourd, Saint Gratien (FR); Geoffroy Berthe, Maichel (FR)

(73) Assignee: Nestec S.A., Vevey (CH)

( * ) Notice: Subject to any disclaimer, the term of this patent is extended or adjusted under 35 U.S.C. 154(b) by 749 days.

(21) Appl. No.: 12/224,017

(22) PCT Filed: Feb. 16, 2007

(86) PCT No.: PCT/EP2007/001359
§ 371 (c)(1),
(2), (4) Date: Aug. 14, 2008

(87) PCT Pub. No.: WO2007/093430
PCT Pub. Date: Aug. 23, 2007

(65) Prior Publication Data
US 2010/0233323 A1  Sep. 16, 2010

(30) Foreign Application Priority Data
Feb. 17, 2006  (EP) .................................. 06003257

(51) Int. Cl.
*A23K 1/18* (2006.01)
(52) U.S. Cl. ............ 119/174; 426/74; 426/87; 426/805; 119/51.01
(58) Field of Classification Search ............... 119/51.01, 119/51.03, 61.5, 72, 174; 426/74, 61, 87, 426/805, 650
See application file for complete search history.

(56) References Cited

U.S. PATENT DOCUMENTS

| 5,851,573 | A | * | 12/1998 | Lepine et al. | .................. 426/74 |
| 6,156,355 | A | * | 12/2000 | Shields et al. | .................. 426/74 |
| 6,493,641 | B1 | * | 12/2002 | Singh et al. | ..................... 702/32 |
| 2003/0143286 | A1 | | 7/2003 | Stevenson | |

FOREIGN PATENT DOCUMENTS

| WO | WO03/008973 | 1/2003 |
| WO | WO2004/077961 | 9/2004 |
| WO | WO2006/002976 | 1/2006 |

OTHER PUBLICATIONS

Finke, M.D.: "Evaluation of the Energy Requirements of Adult Kennel Dogs" Journal of Nutrition, vol. 121 No. 11, Suppl 1991, pp. S22-S28.
Nap, R.C. et al: "Growth and Skeletal Development in Great Dane Pups Fed Different Levels of Protein Intake" Journal of Nutrition, vol. 121, 1991, pp. S107-S113.
Hill, R.C. "The Nutritional Requirements of Exercising Dogs" Journal of Nutrition, US Wistar Institute of Anatomy and Biology, vol. 128, 1998, pp. 268S-2690S.
Kienzle, E. and Rainbird, A., "Maintenance Energy Requirements of Dogs: What is the Correct Value for the Calculation of Metabolic Body Weight in Dogs?" Journal of Nutrition, vol. 121, 1991, pp. S39-S40.
Hawthorne, A.J. et al: Body Weight Changes During Growth in Puppies of Different Breeds: Journal of Nutrition, vol. 134, 2004 pp. 2027S-2030S.
Speakman, J.R. et al. "Age-Related Changes in the Metabolisms and Body Compositions of Three Dog Breeds and Their Relationship to Life Expectancy", Aging Cell, vol. 2, 2003, pp. 265-275.

* cited by examiner

*Primary Examiner* — Rob Swiatek
*Assistant Examiner* — Justin Benedik
(74) *Attorney, Agent, or Firm* — Wendell Ray Guffey; Julie M. Lappin

(57) ABSTRACT

Methods for preparing dog food compositions adapted for dogs with certain body conformation types by categorizing a dog for which the food composition is intended as a robust or athletic body conformation type and formulating a dog food composition to contain feed ingredients beneficial for the categorized dog. Typically, the protein and fat content of the food composition will be adjusted based upon the robust or athletic category for a particular dog or dog type.

19 Claims, No Drawings

METHOD FOR IMPROVING DOG FOOD

CROSS-REFERENCE TO RELATED APPLICATIONS

This application is a national stage application under 35 U.S.C. §371 of PCT/EP2007/001359 filed Feb. 16, 2007, which claims priority to EP Application No. 06003257.0 filed Feb. 16, 2006, the disclosures of which are incorporated herein by reference.

BACKGROUND OF THE INVENTION

1. Field of the Invention

The invention relates generally to methods for preparing dog food compositions and particularly to methods for preparing dog food compositions adapted for dogs with certain body conformation types.

2. Description of the Related Art

Numerous animal foods are well-known in the art. For canines, foods adapted to a canine's age or size can be found on the market. For example, canine foods intended for puppies, adult, and senior canines are well known and available for purchase at most retail outlets that sell dog foods. Similarly, canine foods intended for overweight canines or canines with particular conditions or diseases are known. U.S. Pat. No. 6,156,355 discloses foods that are designed for specific canine breeds. There are, however, variables other than age, size, and heath that distinguish canines of different breeds and affect their food requirements. For example, the influence of breed, body weight, age, and gender on energy requirements has been investigated. The results show that some animals having the same body weight have very different energy requirements. Other studies have shown that age-related changes are observed in the metabolism and body composition of papillons, labrador retrievers, and great danes and that these changes affect life expectancy. Studies have shown that some differences exist in terms of body composition and resting metabolic rate and that these differences are independent of body weight. For example, feeding care will differ between a 30 kilogram (kg) labrador and a 30 kg greyhound of the same age and gender and living in the same environmental conditions because their genetic backgrounds are different and these differences result in different metabolisms and body compositions. For example, the greyhound might require more energy per kg of ideal body weight (Kcal per day=150×Kg Body Weight$^{0.75}$) to stay in ideal body condition and the labrador might require less energy (Kcal per day=110×Kg Body Weight$^{0.75}$).

These known foods are useful for a variety of purposes. However, the selection of a particular food for an individual dog or class of dog is often confusing. The consumer must determine the class and type of the dog and select from foods, none of which may be designed for the particular animal that will consume the food. There is, therefore, a need for new methods for classifying dogs into groups that share particular dietary or food requirements and for diets and foods that meet those particular requirements, particularly relatively simple methods that are convenient for the consumer or skilled artisan. One solution is to classify dogs based on simple and readily observable dog body conformation type and feed such dogs a food composition adapted for dogs with such body conformation type.

SUMMARY OF THE INVENTION

It is, therefore, an object of the present invention to provide methods for preparing dog food compositions adapted for dogs with certain body conformation types.

It is another object of the present invention to provide methods for preparing dog food compositions adapted for robust and athletic dogs.

It is a further object of the present invention to provide methods for classifying dogs by body type conformation.

It is another object of the present invention to provide methods for classifying dogs as having a robust or an athletic body type conformation.

It is a further object of the invention to provide articles of manufacture in the form of kits that contain combinations of devices useful for determining dog body conformation types and food compositions adapted for dogs with certain body conformation types.

One or more of these and other objects are achieved using novel methods for classifying dogs by body type conformation and preparing customized food compositions for dogs based on body type conformation. The methods involve categorizing a dog for which a food composition is intended as a robust or athletic body type conformation and formulating a dog food composition to contain feed ingredients beneficial for the categorized dog. The dogs are classified as robust or athletic conformation types based upon various characteristics such as body mass index, body composition, daily energy requirement, resting metabolic rate, and dog breed. Food compositions for a particular conformation type are prepared to meet the nutritional and similar requirements for the dog based upon parameters relating to the a ratio of energy from protein to energy from fat, the protein content, and the fat content of the food.

Other and further objects, features, and advantages of the present invention will be readily apparent to those skilled in the art.

DETAILED DESCRIPTION OF THE INVENTION

Definitions

The term "dog" means all canine animals, including companion canines such as working dogs and pet dogs.

The term "puppy" means an animal of any age in the juvenile growth and development stage. For example, for dogs, "puppy" typically means an age of up to about 1 year.

The term "adult" means an animal of an age after the completion of the juvenile growth and development stage until development of an increased risk of age-related disease. For example, for dogs, "adult" typically means an age of from about 1 year to about 7 years.

The term "senior" means an animal of an age having an increased risk for age-related disease but may or may not have obvious physical or behavioral characteristics of aging. For example, for dogs, "senior" means an age of from about 7 years to about 11 years.

The term "geriatric" means an animal showing outward signs of aging. For example, for dogs, "geriatric" means an age of about 11 years or more.

The term "miniature dog" means a dog that weighs less than 5 kg.

The term "small dog" means a dog that weighs between 5 and 10 kg.

The term "medium dog" means a dog that weighs between 10 and 25 kg.

The term "large dog" means a dog that weighs between 25 and 40 kg.

The term "giant dog" means a dog that weighs more than 40 kg.

The term "food composition" means compositions suitable for consumption by a dog, including, but not limited to, dry, wet, semi-moist, moist, and liquid food compositions.

The term "single package" means that the components of a kit are physically associated in or with one or more containers and considered a unit for manufacture, distribution, sale, or use. Containers include, but are not limited to, bags, boxes, bottles, shrink wrap packages, stapled or otherwise affixed components, or combinations thereof. A single package may be containers of individual devices and/or food compositions physically associated such that they are considered a unit for manufacture, distribution, sale, or use.

The term "virtual package" means that the components of a kit are associated by directions on one or more physical or virtual kit components instructing the user how to obtain the other components, e.g., in a bag containing one component and directions instructing the user to go to a website, contact a recorded message, view a visual message, or contact a caregiver or instructor to obtain instructions on how to use the kit.

All percentages expressed herein are by weight of the composition on dry matter basis unless specifically stated otherwise. The term "dry matter basis" means that an ingredient's concentration in a composition is measured after any moisture in the composition is removed.

Ranges are used herein for describing each and every value within the range. Any appropriate value within the range can be selected as the upper or lower value for the range.

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise. Similarly, the words "comprise", "comprises", and "comprising" are to be interpreted inclusively rather than exclusively.

Unless defined otherwise, all technical and scientific terms and any acronyms used herein have the same meanings as commonly understood by one of ordinary skill in the art in the field of the invention. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, and other references cited or referred to herein are incorporated herein by reference to the extent allowed by law. The discussion of those references is intended merely to summarize the assertions made therein. No admission is made that any such patents, patent applications, publications or references, or any portion thereof, is relevant prior art for the present invention and the right to challenge the accuracy and pertinence of such patents, patent applications, publications, and other references is specifically reserved.

THE INVENTION

In one aspect, the present invention provides methods for preparing dog food compositions adapted for dogs with certain body conformation types. The methods comprise (1) categorizing a dog for which a food composition is intended as a robust or athletic body type conformation and (2) formulating a dog food composition to contain feed ingredients beneficial for the categorized dog. The invention offers considerable advantages over prior methods for preparing and selecting dog food compositions. The invention provides consumers and skilled artisans a simplified method to prepare and select dog food compositions for a particular dog or class of dog. The methods permit a skilled artisan to use several variables to categorize a dog based upon body conformation type and prepare and/or select an appropriate food composition for the dog. Such food composition is better adapted for the dog than traditional food compositions. Once prepared and/or marketed, a consumer can simply select an appropriate food composition based upon the dog body conformation type of the consumer's dog.

Generally, a robust dog is a dog selected from the group consisting of a toy dog, a companion dog, a working dog, a guard dog, a scent hound, and a retriever that has at least one characteristic selected from the group consisting of (1) body mass index greater than 90 kg/m$^2$ and (2) an energy requirement of less than 120*(kilograms of ideal body weight)$^{0.75}$ kilocalories per day. In a further embodiment, the dog has at least one additional characteristic selected from the group consisting of (1) a thorax/waist circumference ratio less than 1.5; (2) a low body surface/kg; (3) a fat to muscle ratio greater than 1; and (4) a fat mass greater than 15%.

The dog food composition for a robust dog comprises food ingredients that provide a ratio of energy from protein to energy from fat greater than 0.80. Preferably, the food composition has a protein content of from about 20-30% and a fat content less than about 15%.

Generally, an athletic dog is a dog selected from the group consisting of a toy dog, a companion dog, a herding dog, a pointing dog, a performance dog, a sight hound, a flushing spaniel, and a terrier and characterized as athletic because the dog has least one characteristic selected from the group consisting of (1) body mass index less than 90 kg/m$^2$ and (2) an energy requirement of more than 120*(kilograms of ideal body weight)$^{0.75}$ kilocalories per day. In a further embodiment, the dog has at least one additional characteristic selected from the group consisting of (1) a thorax/waist circumference ratio greater than 1.5; (2) a high body surface/kg; (3) a fat to muscle ratio less than 1; and (4) a fat mass less than 15%.

The dog food composition for an athletic dog comprises food ingredients that provide a ratio of energy from protein to energy from fat less than 0.80. Preferably, the food composition has a protein content of from about 20-30% on a dry matter basis and a fat content of from about 15-25% on a dry matter basis.

The dogs may be further classified as a puppy, an adult dog, a senior dog, or a geriatric dog. Similarly, the dogs may be classified as miniature, small, medium, large, or giant based upon their weight.

As stated, a dog is classified as either robust or athletic based upon the dog's body conformation type. Generally, body type conformations are influenced by and dependent upon a variety of factors, including the body mass index, body composition, daily energy requirement, resting metabolic rate, dog breed, and genetics differentiation during breeding history.

The body mass index may be calculated by the following formula: weight (kg)/[shoulder height (m)]$^2$. A robust dog will generally have a body mass index greater than 90 kg/m$^2$.

An athletic dog will have a body mass index less than 90 kg/m². Examples of typical BMI values for robust dogs or athletic dogs are:

| Robust dogs | Athletic dogs |
| --- | --- |
| Saint Bernard: 158.2 kg/m² | Greyhound: 54.8 kg/m² |
| Bull dog: 211.5 kg/m² | Irish setter: 61.6 kg/m² |
| Pekingese: 99.6 kg/m² | Fox terrier: 51.8 kg/m² |

Given the body conformation and body composition of robust and athletic dogs, athletic dogs may be metabolically more active than robust dogs. Therefore, to maintain ideal body condition in all dogs, robust dogs require less than $120*(\text{kilograms of ideal body weight})^{0.75}$ kilocalories per day. In contrast, athletic dogs require more than $120*(\text{kilograms of ideal body weight})^{0.75}$ kilocalories per day.

There are a number of criteria defining the body composition. For instance, thorax/waist circumference ratio, body surface per kilogram, fat to muscle ratio, fat mass all play a role in determining the body composition. A dog having a thorax/waist circumference ratio greater than 1.5, a high body surface per kilogram, a fat to muscle ratio less than 1, a fat mass less than 15%, preferably between 10-15% of the total body mass, is considered to be an athletic dog. A dog having a thorax/waist circumference ratio less than 1.5, a low body surface per kilogram, a fat to muscle ratio greater than 1, a fat mass more than 15%, preferably between 15-20% of the total body mass, is considered to be a robust dog.

The resting metabolic rate is a measure of the energy utilized when a dog is in a resting state as a function of time. A RMR (resting metabolic rate) greater than 10000 kJ/day characterizes an athletic dog, whereas a RMR of less than 10000 kJ/day is typical of robust dogs. Athletic dogs generally have a RMR which is about 57% higher than the RMR of robust dogs.

Based on the preceding criteria, it has been found, as a general rule, that different breeds can be categorized into robust or athletic. The following tables show typical examples of breed and the category to which they belong.

| Robust | |
| --- | --- |
| Breed category | Representative breeds |
| Toy and companion | Pekingese |
|  | French Bulldog |
| Scent hounds | Bloodhound |
|  | Bassett hound |
|  | Beagle |
| Working and guard | Tibetan Mastiff |
|  | Rottweiler |
|  | St Bernard |
| Retrievers | Irish water Spaniel |
|  | Labrador Retriever |
|  | Golden retriever |

| Athletic | |
| --- | --- |
| Breed category | Representative breeds |
| Toy and companion | Cavalier King Charles Spaniel |
|  | Manchester Terrier |
|  | Yorkshire Terrier |

| Athletic | |
| --- | --- |
| Breed category | Representative breeds |
| Flushing spaniels | English Springer Spaniel |
|  | Brittany Spaniel |
| Terriers | Fox terrier |
|  | Airedale terrier |
|  | Cairn terrier |
| Pointers | English Pointer |
|  | English Setter |
| Sight hounds | Greyhound |
|  | Afghan Hound |
| Herding dogs | Canaan dog |
|  | Old English sheepdog |
|  | German Shepherd |

Categorizing a dog as robust or athletic may also be influenced by the breeding history of a dog. For instance, dogs may have a different breeding history and genetic background than the breed category in which they are categorized. Generally, dogs having some athletic blood in their breeding history tend to have kept the athletic morphology as a dominant phenotype and have higher energy needs. For example, the Great Dane that belongs to the working and guard dog group (and therefore should be classified as a robust dog) may be classified as athletic because of its morphology and breeding history (sight hounds blood). It has a clear athletic type body conformation, i.e., deep chest and thin abdomen and high daily energy requirements to maintain his ideal body weight.

The dogs may be further classified as a puppy, an adult dog, a senior dog, or a geriatric dog. Similarly, the dogs may be classified as miniature, small, medium, large, or giant based upon their weight. Within these age and body weight ranges, dogs can be further classified as robust or athletic.

The second step in the method of the present invention is adapting the composition, i.e., the protein and fat content, of a dog food composition depending on whether a dog is classified as robust or as athletic.

Activity level and type differ according to body type conformation. For example, a robust dog will be spontaneously engaged in mild (e.g., slow walking), moderate (e.g., brisk walking) or occasionally intense (e.g., running) activity types. An athletic dog, in comparison, will mainly be voluntary involved in moderate, intense or very intense (e.g., fast running) activities. Within these different levels of activity, dogs can be further classified as robust or athletic.

A dog food composition having a ratio of energy from protein to energy from fat below 0.80 has been found to be advantageous to athletic dogs. A food composition high in protein and high in fat is particularly well adapted for athletic dogs. Typically, a dog food composition for athletic dogs has from about 20-30% protein and from about 15-25% fat. Indeed, a food composition dense in energy from fat will provide an athletic dog with sufficient energy for the moderate to very intense activities (i.e., brisk walk to fast run) in which it spontaneously gets involved. Furthermore, the energy from protein to the energy from fat ratio is found to be advantageous in such a food composition for maintaining the lean body mass of athletic dogs.

Similarly, a particularly well adapted robust dog food composition will have the ratio of energy from protein to energy from fat in such a food composition greater than 0.80. More specifically, a protein content from about 20-30% and less than about 15% fat. Because of their low resting metabolic rate, such a food composition is ideally adapted to robust dogs. The composition will have the effect of limiting the fat intake of robust dogs and therefore their tendency to be overweight.

Functional ingredients may also be used in the methods of the present invention, whether the food composition is intended for athletic dogs or for robust dogs. Functional ingredients mean any ingredient which confers a health benefit to dog consuming the food to which the ingredient is added. These functional ingredients include carbohydrates, fibers, vitamins, minerals, prebiotics, probiotics, and the like, or combinations thereof. Additionally, functional ingredients which limit fat accumulation may be added to the robust dog food. These include conjugated linoleic acid (CLA), isoflavones, and the like, or combinations thereof.

Typical dog food ingredients used in the preparation of a dog food comprise meat sources (e.g., chicken, lamb etc.), other protein sources (e.g., dehydrated poultry protein, dried whole egg, etc.), rice, maize, wheat, animal fat, fiber (e.g., beet pulp, oat fiber etc.), oil (e.g., sunflower oil, fish oil etc.), yeast, amino acids, minerals and functional ingredients.

When the dog is fed a dog food composition according to a method of the present invention, the feeding recommendations are adjusted depending on whether the dog is robust or athletic.

Depending on their level of activity (i.e., mild, moderate or intense) and frequency, the robust dogs will require an energy intake (in kilocalories) less than $120\times$(kilograms of ideal body weight)$^{0.75}$ kilocalories per day. Depending on their level of activity (i.e., moderate, intense or very intense), the athletic dogs will require an energy intake (in kilocalories) more than $120\times$(kilograms of ideal body weight)$^{0.75}$ kilocalories per day.

In another aspect, the present invention provides for the use of dog food ingredients in the preparation or manufacture of a dog food composition for feeding to robust dogs. The composition comprises protein in an amount of from about 20% to about 30% and a fat content less than about 15%. In one embodiment, the ratio of energy from protein to energy from fat in the food composition is greater than 0.80.

In a further aspect, the present invention provides for the use of dog food ingredients in the manufacture of a dog food composition for feeding to athletic dogs. The composition comprises protein in an amount of from about 20% to about 30% and a fat in an amount of from about 15% to about 25%. In one embodiment, the ratio of energy from protein to energy from fat in the food composition is less than 0.80.

In another aspect, the present invention provides food compositions suitable for feeding to a robust dog. The compositions comprise comprises protein in an amount of from about 20% to about 30% and a fat content less than about 15%. In one embodiment, the ratio of energy from protein to energy from fat in the food composition is greater than 0.80.

In a further aspect, the present invention provides food compositions suitable for feeding to an athletic dog. The compositions comprise protein in an amount of from about 20% to about 30% and a fat in an amount of from about 15% to about 25%. In one embodiment, the ratio of energy from protein to energy from fat in the food composition is less than 0.80.

In another aspect, the present invention provides kits suitable for use in categorizing a dog based upon body conformation type. The kits comprise in separate containers in a single package or in separate containers in a virtual package, as appropriate for the kit component, a device useful to a skilled artisan or consumer for determining body conformation type and at least one of (1) a food composition adapted for feeding to a robust dog, (2) a food composition adapted for feeding to an athletic dog, and (3) instructions for how to use the device to determine dog body conformation type, i.e., robust or athletic.

Any device that can be used to determine dog body conformation types can be used in the present invention. Suitable devices include charts that illustrate a dog and the characteristics that influence body conformation types and electronic or similar devices that determine body conformation type based upon body scoring. In one embodiment, the device is a computer or similar device that is capable of connecting to the internet. The computer or similar device connects to a website that provides information and instructions that enable the user to determine a dog body conformation type based on data input by the user into the computer or similar device, e.g., a cell phone or blackberry device.

When the kit comprises a virtual package, the kit is limited to instructions in a virtual environment in combination with one or more physical kit components. In one embodiment, the kit contains a device for determining body conformation types and a container of food for consumption by the robust or athletic dog. The kit may contain additional items such as a device for containing the food, e.g., a food bowl. In another embodiment, kit contains additional nutritional supplements such as vitamins and minerals that promote good health in an animal.

In another aspect, the present invention provides a means for communicating information about or instructions for one or more of (1) determining dog body conformation type, (2) using food compositions adapted for robust or athletic dogs to maintain health and well being for the dog, and (3) using the kits of the present invention determining dog body conformation types and selecting the appropriate adapted food for the dog based upon body conformation type. The means comprises a document, digital storage media, optical storage media, audio presentation, or visual display containing the information or instructions. In certain embodiments, the communication means is a displayed web site, visual display kiosk, brochure, product label, package insert, advertisement, handout, public announcement, audiotape, videotape, DVD, CD-ROM, computer readable chip, computer readable card, computer readable disk, computer memory, or combination thereof containing such information or instructions. Useful information includes one or more of (1) methods and techniques for determining dog body conformation types and (2) contact information for dog caregivers to use if they have a question about the invention and its use. The communication means is useful for instructing on the benefits of using the present invention and communicating information about dog body conformation types and foods adapted for dogs based upon body conformation type.

In another aspect, the present invention provides a dog food composition prepared using the method of claim 1.

In another aspect, the present invention provides a package comprising a material suitable for containing a dog food composition adapted for consumption by a robust or an athletic dog, preferably a dog food composition prepared using the method of claim 1, and a label affixed to the package containing a word or words, picture, design, acronym, slogan, phrase, or other device, or combination thereof, that indicates that the contents of the package contains a food composition adapted for consumption by a robust or an athletic dog. Typically, such device comprises the words "formulated for robust dogs" or "formulated for athletic dogs" or an equivalent expression printed on the package. Any package or packaging material suitable for containing dog food is useful in the invention, e.g., a bag, box, bottle, can, pouch, and the like manufactured from paper, plastic, foil, metal, and the like. In a preferred embodiment, the package contains a dog food composition adapted for a robust dog or an athletic dog, as appropriate for the label, preferably a dog food composition prepared using the method of claim 1.

EXAMPLES

The invention can be further illustrated by the following examples, although it will be understood that these examples are included merely for purposes of illustration and are not intended to limit the scope of the invention unless otherwise specifically indicated.

Example 1

Typical nutritional profile of foods for robust and athletic dogs (as is):

| Robust dog food | Athletic dog food |
| --- | --- |
| Protein: 25-30% | Protein: 25-35% |
| Fat: 10-15% | Fat: 15-25% |
| Carbohydrate: 40-45% | Carbohydrate: 30-40% |
| Fibre: 1-5% | Fiber: 1-5% |
| Ash: 5-10% | Ash: 5-10% |
| Moisture: 5-10% | Moisture: 5-10% |

Example 2

Typical composition of dry dog food:
For Robust: 8% Moisture, 27% Protein, 13% Fat, 7% Ash and 3% Fibre.
  Total Energy content=Energy from Carbohydrate+Energy from Protein+Energy from Fat=(100−8−27−13−7−3)*3.5+27*3.5+13*8.5=352 Kcal/100 g.
  Energy from protein=(27*3.5)/352*100=26.8%
  Energy from Fat=(13*8.5)/352*100=31.4%
  Ratio Energy from protein to energy from fat=26.8/31.4=0.85 (above 0.80)
For Athletic: 8% Moisture, 29% Protein, 19% Fat, 7% Ash and 2% Fibre.
  Total Energy content=Energy from Carbohydrate+Energy from Protein+Energy from Fat=(100−8−29−19−7−2)*3.5+29*3.5+19*8.5=385.5 Kcal/100 g
  Energy from protein=(29*3.5)/385.5*100=26.3%
  Energy from Fat=(19*8.5)/385.5*100=41.8%
  Ratio Energy from protein to energy from fat=26.3/41.8=0.63 (below 0.80)

Example 3

Typical dry dog foods contain (1) recipe components, by decreasing order of inclusion, for a robust type of dog: Chicken, rice, maize, maize gluten meal, wheat, dehydrated poultry protein, liver digest, oat fiber, dehydrated tuna protein, animal fat, beet pulp, dried whole egg, hydrolysed sunflower oil, yeast, fish oil, calcium phosphate, sodium chloride, potassium chloride, minerals, L-Lysine, DL-Methionine and (2) recipe components, by decreasing order of inclusion, for an athletic type of dog: Lamb, rice, maize, dehydrated poultry protein, maize gluten meal, animal fat, liver digest, dehydrated salmon protein, beet pulp, dried whole egg, calcium phosphate, fish oil, yeast, potassium chloride, sodium chloride, minerals, L-Lysine, DL-Methionine.

In the specification, there have been disclosed typical preferred embodiments of the invention and, although specific terms are employed, they are used in a generic and descriptive sense only and not for purposes of limitation, the scope of the invention being set forth in the claims. Obviously many modifications and variations of the invention are possible in light of the above teachings. It is therefore to be understood that within the scope of the appended claims the invention may be practiced otherwise than as specifically described.

What is claimed is:

1. A method for preparing dog food compositions adapted for dogs with certain body conformation types comprising:
   (1) categorizing a dog for which the food composition is intended as a robust or athletic body conformation type; wherein a robust dog is characterized by having least one characteristic selected from the group consisting of (1) body mass index greater than 90 kg/m$^2$ and (2) an energy requirement of less than 120*(kilograms of ideal body weight)$^{0.75}$ kilocalories per day, and an athletic dog is characterized by having at least one characteristic selected from the group consisting of (1) body mass index less than 90 kg/m$^2$ and (2) an energy requirement of more than 120*(kilograms of ideal body weight)$^{0.75}$ kilocalories per day; and
   (2) formulating a dog food composition to contain feed ingredients beneficial for the categorized dog.

2. The method of claim 1 wherein the robust and athletic conformation types are dependent upon at least one of body mass index, body composition, daily energy requirement, resting metabolic rate, and dog breed.

3. The method of claim 2 wherein the body conformation type is influenced by genetics differentiation during breeding history.

4. The method of claim 1 wherein the robust dog is selected from the group consisting of a toy dog, a companion dog, a working dog, a guard dog, a scent hound, and a retriever.

5. The method of claim 4 wherein the dog has at least one additional characteristic selected from the group consisting of (1) a thorax/waist circumference ratio less than 1.5; (2) a low body surface/kg; (3) a fat to muscle ratio greater than 1; and (4) a fat mass greater than 15%.

6. The method of claim 1 wherein the dog food composition for robust dogs has a ratio of energy from protein to energy from fat greater than 0.80.

7. The method of claim 1 wherein the dog food composition for robust dogs has a protein content of from about 20-30% on a dry matter basis and a fat content less than about 15%.

8. The method of claim 1 wherein the athletic dog is selected from the group consisting of a toy dog, a companion dog, a herding dog, a pointing dog, a performance dog, a sight hound, a flushing spaniel, and a terrier.

9. The method of claim 8 wherein the dog has at least one additional characteristic selected from the group consisting of (1) a thorax/waist circumference ratio greater than 1.5; (2) a high body surface/kg; (3) a fat to muscle ratio less than 1; and (4) a fat mass less than 15%.

10. The method of claim 1 wherein the dog food composition for athletic dogs has a ratio of energy from protein to enemy from fat less than 0.80.

11. The method of claim 1 wherein the dog food composition for athletic dogs has a protein content of from about 20-30% on a dry matter basis and a fat content of from about 15-25% on a dry matter basis.

12. The method of claim 1 wherein the dog is further categorized as a puppy, an adult dog, a senior dog, or a geriatric dog based upon age.

13. The method of claim 12 wherein the puppy is a dog less than 1 year old, an adult is a dog from 1 to 7 years old, a senior is a dog is a dog from 7 to 11 years old, and a geriatric dog is older than 11 years old.

14. The method of claim 1 wherein the dog is further categorized as miniature, small, medium, large, or giant based upon weight.

15. The method of claim 14 wherein the miniature dog weighs less than 5 kg, the small dog weighs between 5 and 10 kg, the medium dog weighs between 10 and 25 kg; the large dog weighs between 25 and 40 kg; and the giant dog weighs more than 40 kg.

16. The method of claim 1 wherein the dog food composition is a dry, wet, semi-moist, moist, or liquid food composition.

17. A dog food composition prepared using the method if claim 1.

18. The composition of claim 17 wherein the composition is for robust dogs and has a ratio of energy from protein to energy from fat greater than 0.80.

19. The composition of claim 17 wherein the composition is for athletic dogs and has a ratio of energy from protein to energy from fat less than 0.80.

* * * * *